No. 30,089.   PATENTED SEPT. 18, 1860.
L. T. PITKIN.
FRAME FOR SWINGING LAMPS OR TORCHES.
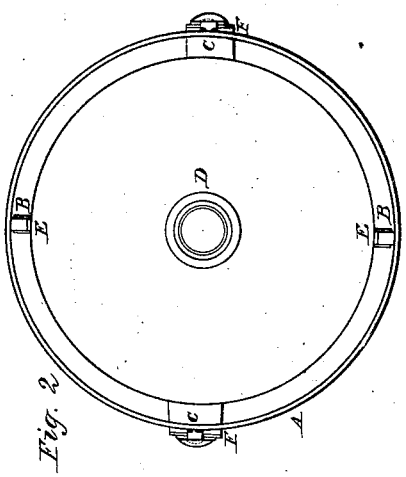
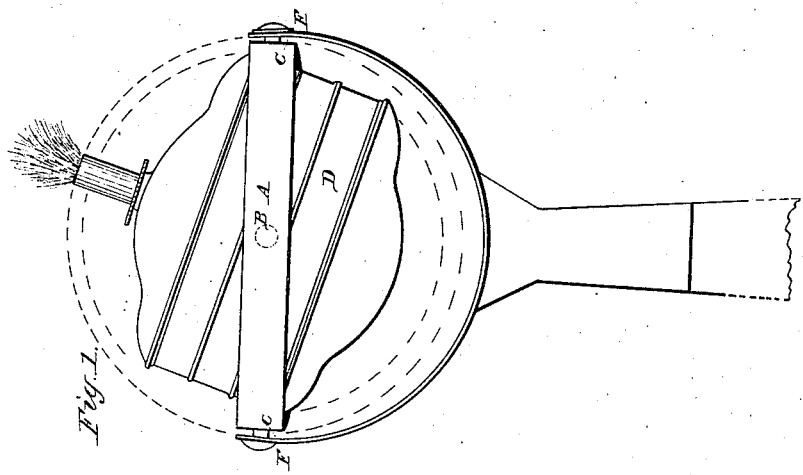
Witnesses.
Wm. Vine
E. Foster.
Inventor.
L. T. Pitkin

UNITED STATES PATENT OFFICE.

LEONARD T. PITKIN, OF HARTFORD, CONNECTICUT.

FRAME FOR SWINGING LAMPS OR TORCHES.

Specification of Letters Patent No. 30,089, dated September 18, 1860.

*To all whom it may concern:*

Be it known that I, LEONARD T. PITKIN, of the city of Hartford, county of Hartford, and State of Connecticut, have invented a new and useful Improvement in the Mode of Constructing Frames to Contain Lamps or Torches; and I do hereby declare that the following is a correct description thereof, reference being had to the accompanying drawing and to the letters of reference marked thereon.

The nature of my invention consists in the arrangement and application of a malleable iron ring to form part of the revolving and oscillating frame to contain the lamp or torch.

To enable others skilled in the art to make and use my invention I will proceed to describe its construction and operation.

Figure 1 is a view of the torch and frame. Fig. 2 a plan view of the ring.

In the construction of the torch frame I use the same combination of rings and joints to allow the free action and movement of the torch while being used or carried in the customary manner.

The inner ring A to which the torch is suspended is generally composed of tin with soldered joints, and the several parts where the pivots are attached are soldered on, and the metal itself is of a soft, flexible and fusible nature. The consequence is that when the revolving frame is held in an inclined position (the torch remains in a vertical position caused by the natural action of the universal joint movement) the flame comes in contact with the solder and soft metal causing it to melt and destroy the frame. My improvement obviates and remedies this defect in the construction of the torch or lamp frame.

I compose and construct the inner circular and oscillating ring A, of malleable iron or other metal with the pivots B B and C C, in one solid piece, so that the flame of the torch will have no effect upon it in whatever position the frame may be held. The outer pivots C, C, pass through the second ring F and may be riveted if required with a washer and cap to make a neat finish. The inner pivots B, B, are attached to the lamp D by means of the socket E allowing it freedom to revolve and oscillate freely.

The utility of my improvement consists in the permanency of the frame, with the economy of and lightness of construction.

What I claim as my invention and desire to secure by Letters Patent, is—

The solid metal ring A and cast with the pivots B B, C C, in the manner and for the purpose substantially as herein set forth and described.

L. T. PITKIN.

Witnesses:
 WM. VINE,
 CHAS. E. PERKINS.